(12) United States Patent
Takobe et al.

(10) Patent No.: US 10,514,565 B2
(45) Date of Patent: Dec. 24, 2019

(54) DISPLAY APPARATUS

(71) Applicant: Sakai Display Products Corporation, Sakai-shi, Osaka (JP)

(72) Inventors: Tomonori Takobe, Sakai (JP); Nobuhiro Yonezawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 48 days.

(21) Appl. No.: 15/509,813

(22) PCT Filed: Oct. 16, 2014

(86) PCT No.: PCT/JP2014/077568
§ 371 (c)(1),
(2) Date: Mar. 8, 2017

(87) PCT Pub. No.: WO2016/059704
PCT Pub. Date: Apr. 21, 2016

(65) Prior Publication Data
US 2017/0299805 A1    Oct. 19, 2017

(51) Int. Cl.
| | | |
|---|---|---|
| *G02F 1/1333* | (2006.01) | |
| *F21V 8/00* | (2006.01) | |
| *G02F 1/1335* | (2006.01) | |
| *G02F 1/13357* | (2006.01) | |

(52) U.S. Cl.
CPC ..... *G02F 1/133308* (2013.01); *G02B 6/0088* (2013.01); *G02B 6/0055* (2013.01); *G02B 6/0065* (2013.01); *G02F 1/133615* (2013.01); *G02F 2001/133317* (2013.01)

(58) Field of Classification Search
CPC .............. G02F 1/133308; G02F 2001/133317
See application file for complete search history.

(56) References Cited

U.S. PATENT DOCUMENTS

| | | | |
|---|---|---|---|
| 2008/0210843 A1* | 9/2008 | Han ..................... | H05K 5/0213 361/679.01 |
| 2009/0103282 A1* | 4/2009 | Itaya .................... | G02B 6/0068 362/97.1 |

(Continued)

FOREIGN PATENT DOCUMENTS

| | | |
|---|---|---|
| CN | 103148416 A | 6/2013 |
| JP | 2003-330377 A | 11/2003 |

(Continued)

*Primary Examiner* — Jessica M Merlin
(74) *Attorney, Agent, or Firm* — Rudy J. Ng; Bret E. Field; Bozicevic, Field & Francis LLP

(57) ABSTRACT

Provided is a display apparatus capable of realizing the reduction in thickness and border width even in a case of the curved display and keeping a display quality successfully. The display apparatus is equipped with: a liquid-crystal panel prepared by enclosing a liquid-crystal material between a pair of glass substrates being opposed to each other; a light guide plate being opposed to the liquid-crystal panel and being made of glass; and an optical sheet arranged between the liquid-crystal panel and the light guide plate; and a frame body which joins respective peripheral portions of the liquid-crystal panel and the light guide plate with a predetermined distance between the liquid-crystal panel and the light guide plate, and having a flexibility.

14 Claims, 15 Drawing Sheets

(56) References Cited

U.S. PATENT DOCUMENTS

| | | | |
|---|---|---|---|
| 2010/0328571 A1* | 12/2010 | Itaya | G02F 1/133308 |
| | | | 349/58 |
| 2011/0102721 A1 | 5/2011 | Enomoto | |
| 2012/0300153 A1 | 11/2012 | Fujii et al. | |
| 2014/0204310 A1 | 7/2014 | Lee et al. | |
| 2014/0293136 A1* | 10/2014 | Mouri | G02B 6/009 |
| | | | 348/725 |
| 2014/0347600 A1* | 11/2014 | Yun | G02B 6/0055 |
| | | | 349/62 |
| 2015/0036077 A1* | 2/2015 | Lee | G02B 6/0081 |
| | | | 349/65 |

FOREIGN PATENT DOCUMENTS

| | | |
|---|---|---|
| JP | 2007-232809 A | 9/2007 |
| JP | 2010-026372 A | 2/2010 |
| JP | 2012-242805 A | 12/2012 |
| JP | 2014-142614 A | 8/2014 |
| WO | WO2010007716 A1 | 1/2010 |

\* cited by examiner

F I G. 5
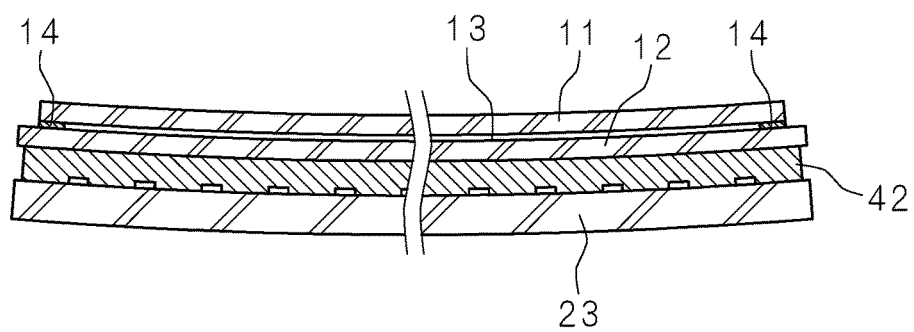

F I G. 9
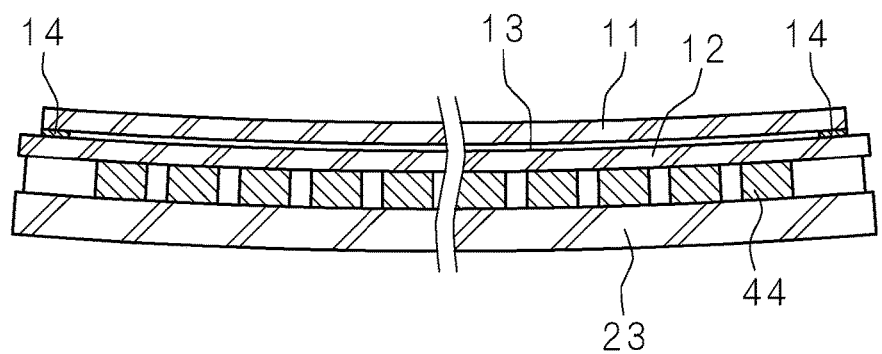

DISPLAY APPARATUS

This application is the national phase under 35 U.S.C. § 371 of PCT International Application No. PCT/JP2014/077568 which has an International filing date of Oct. 16, 2014 and designated the United States of America.

BACKGROUND OF THE INVENTION

1. Field of the Invention

The present invention relates to a display apparatus which displays an image using a liquid-crystal panel, and to a display apparatus having a configuration capable of further realizing reduction in thickness and border width of the display apparatus.

2. Description of Related Art

In a recent display apparatus employing a liquid-crystal panel, edge light type light source devices are commonly used for thinning the display apparatus. The edge light type light source device is so configured that light sources such as light emitting diode are arranged to be opposed to one or a plurality of side surfaces of a light guide plate whose one broad surface is opposed to the liquid-crystal panel, with a predetermined distance in between and that light entering the light guide plate from the light source is emitted from the one broad surface so as to uniformly irradiate the liquid-crystal panel. An optical sheet for diffusing or condensing light emitted from the light guide plate is provided between the liquid-crystal panel and the light guide plate.

The light guide plate made of resin such as PMMA (Poly (methyl methacrylate)), MS is used in many cases. Moreover, the optical sheet is a flexible film such as PET (Polyethylene terephthalate). That is, the light guide plate and the optical sheet have properties of expanding/contracting and deflecting in itself and also are made of a material whose thermal expansion coefficient is high so as to thermally expand or thermally contract. Particularly, the optical sheet is the film, which readily causes wrinkles or deflections. In a conventional display apparatus, a light guide plate made of resin is joined to a liquid-crystal panel made of glass apart from each other for an air gap via a frame body, the optical sheet is enclosed in the air gap and also the optical sheet is fastened to the light guide plate. The configuration of the conventional display apparatus will not be a problem in a small display apparatus, but may cause problems in a large display apparatus as the deflections of the light guide plate and the optical sheet and also the separation of the liquid-crystal panel from the light guide plate or the separation of the optical sheet from the light guide plate, or the wrinkle of the optical sheet occur due to differences among the thermal expansion coefficients of the light guide plate, the liquid-crystal panel and the optical sheet.

Therefore, in the large display apparatus with the light guide plate made of resin and the optical sheet, a holding member is required that holds the light guide plate and the optical sheet so that the light guide plate and the optical sheet are positioned with respect to the liquid-crystal panel with a margin for possible thermal expansion. The holding member for the light guide plate and the optical sheet is a frame body whose size is larger than respective outer peripheries of the light guide plate and the optical sheet, for example, and the holding member also has a thickness larger than those of the light guide plate and the optical sheet. Furthermore, in the display apparatus, a so-called bezel is provided that covers such a holding member.

In the field of the display apparatus, a curved display with a liquid-crystal panel is also put into practical use. A conventional curved display apparatus is proposed that has a configuration preventing the occurrence of defects due to the separation of members from each other, the warp and the like, in the case where the liquid-crystal panel of the curved display is curved.

SUMMARY OF THE INVENTION

A slimmed border is required in the recent display apparatus, the slimmed border means that a border width between a pixel region of the liquid-crystal panel and an outer periphery of a main body is reduced as much as possible. The slimmed border has an advantage of being able to obscure boundaries between a plurality of display apparatuses in a multi-display system in which the display apparatuses are aligned, in addition to an advantage of improving the design.

However, in the display apparatus having a holding structure as described above, the reduction in thickness of the apparatus is not sufficient because of the thickness of the holding member, and the reduction in border width of the apparatus is also not sufficient because of the difference between the size of the holding member and the outer periphery of the light guide plate or the optical sheet.

Furthermore, when the curved display is configured, the curved display has to be configured to have a curved-plate structure in consideration of the deformation such as the thermal expansions of the light guide plate and optical sheet themselves, which makes it difficult to reduce the thickness and the border width of the curved display. Although the conventional curved display apparatus is proposed to prevent the defects occurring when the liquid-crystal panel is curved, it is not described that a configuration for positioning the light guide plate to be disposed along the curved liquid-crystal panel with respect to the liquid-crystal panel.

The present invention has been made in view of the circumstances described above, and aims to provide a display apparatus capable of realizing the reduction in thickness and border width even in a case of the curved display and keeping a display quality successfully.

A display apparatus according to one embodiment of the present invention, comprises: a liquid-crystal panel provided with a pair of glass substrates being opposed to each other, a liquid-crystal material being enclosed between the pair of glass substrates; a plate-shaped member being opposed to the liquid-crystal panel and having a light-transmittance; and an optical sheet arranged between the liquid-crystal panel and the plate-shaped member, wherein the plate-shaped member is made of glass, the display apparatus further comprises a frame body which joins respective peripheral portions of the liquid-crystal panel and the plate-shaped member with a predetermined distance between the liquid-crystal panel and the plate-shaped member, and the frame body has a flexibility.

In the display apparatus according to the embodiment of the present invention, the liquid-crystal panel and the plate-shaped member has a curved surface.

In the display apparatus according to the embodiment of the present invention, the frame body is provided with a plurality of recessed portions.

In the display apparatus according to the embodiment of the present invention, the plurality of recessed portions are provided on one or both of contact surfaces of the frame body in contact with the liquid-crystal panel and the plate-shaped member, in a thickness direction.

In the display apparatus according to the embodiment of the present invention, the plurality of recessed portions are provided on an outer peripheral surface of the frame body.

In the display apparatus according to the embodiment of the present invention, the plurality of recessed portions have a comb-teeth shape in one or both of an outer peripheral and an inner peripheral of the frame body.

In the display apparatus according to the embodiment of the present invention, the frame body is made of a porous material.

According to the embodiment of the present invention, the plate-shaped member with the light-transmittance which is used as the light guide plate is made of glass. Therefore, the properties of the light guide plate, such as a thermal expansion, a thermal contraction or a rigidity, are similar to the properties of the liquid-crystal panel, so that the light guide plate and the glass substrates can be joined to be integrally handled. The light guide plate is joined to the liquid-crystal panel, which does not require a holding structure for positioning the light guide plate with respect to the liquid-crystal panel. Furthermore, the optical sheet is also arranged in a gap located within the frame body joining the light guide plate to the liquid-crystal panel, which does not require a holding structure for positioning the optical sheet with respect to the liquid-crystal panel or the light guide plate. Moreover, as glass has a rigidity higher than resin such as PMMA and MS, the shape (flatness or a curved surface) of the light guide plate can be maintained, thereby eliminating the need for a holding member for maintaining the shape. Furthermore, because of the appropriate predetermined gap located within the frame body, the optical sheet can thermally expand in the frame body, which prevents the occurrence of wrinkles or deflections of the optical sheet. Furthermore, in the embodiment of the present invention, the frame body has the flexibility, which reduces the possibility of the damage of the frame body itself, the separation of the frame body from the liquid-crystal panel or the light guide plate and the like even if the liquid-crystal panel and the light guide plate are integrally handled and curved.

In the embodiment of the present invention, the frame body is provided with the plurality of recessed portions. Even if the frame body joining the liquid-crystal panel to the light guide plate contracts at a part proximal to the liquid-crystal panel and expands at a part proximal to the light guide plate, or vice versa, the recessed portions provided in the frame body contract or expand, which absorbs the difference of expansion/contraction and prevents the damage or the separation.

In the embodiment of the present invention, the plurality of recessed portions may be provided on one or both of contact surfaces of the frame body in contact with the liquid-crystal panel and the light guide plate, so as to be recessed in the thickness direction. Even if the contact surface in contact with the liquid-crystal panel contracts and the contact surface in contact with the light guide plate expands, or vice versa, by the recessed portions of the display apparatus in the thickness direction the recessed portions contract or expand, which absorbs the difference of expansion/contraction and prevents the damage or the separation.

In the embodiment of the present invention, the plurality of recessed portions may be provided on the outer peripheral surface of the frame body so as to be recessed in a direction orthogonal to the thickness of the display apparatus. Even if the frame body contracts at a part proximal to the liquid-crystal panel and expands at a part proximal to the light guide plate, or vice versa, spaces formed by the recessed portions provided in the frame body contract or enlarge, which absorbs the difference of expansion/contraction and prevents the damage or the separation.

In the embodiment of the present invention, the plurality of recessed portions may be provided so as to have a comb-teeth shape in one or both of the outer peripheral and the inner circumference of the frame body. Even if the frame body contracts at a part proximal to the liquid-crystal panel and expands at a part proximal to the light guide plate, or vice versa, gaps between the comb-teeth contract or enlarge, which absorbs the difference of expansion/contraction and prevents the damage or the separation.

In the embodiment of the present invention, the frame body is made of the porous material. Even if the frame body joining the liquid-crystal panel to the light guide plate contracts at a part proximal to the liquid-crystal panel and expands at a part proximal to the light guide plate, or vice versa, some of cavities in the frame body contract and some of the others enlarge, which absorbs the difference of expansion/contraction and prevents the damage or the separation.

According to the embodiment of the present invention, the liquid-crystal panel is joined to the light guide plate via the frame body for enclosing the optical sheet while keeping a thermally expandable condition therein, which makes it possible to realize the reduction in thickness and border width and also to reduce the possibility of the damage or the separation of the frame body when the liquid-crystal panel is curved. This can realize the reduction in thickness and border width and also keep the display quality successfully even in the case of the curved display.

BRIEF DESCRIPTION OF THE DRAWINGS

FIG. 5 is a schematic sectional view of a frame body of the other shape according to Embodiment 1.

FIG. 9 is a schematic sectional view of the frame body of the other shape, the liquid-crystal panel and the light guide plate.

DESCRIPTION OF THE PREFERRED EMBODIMENTS

Embodiments of the present invention will specifically be described below with reference to the drawings. It is to be understood that Embodiments described below are illustrative and the present invention is not limited to the following configurations.

Embodiment 1

Figure 1:
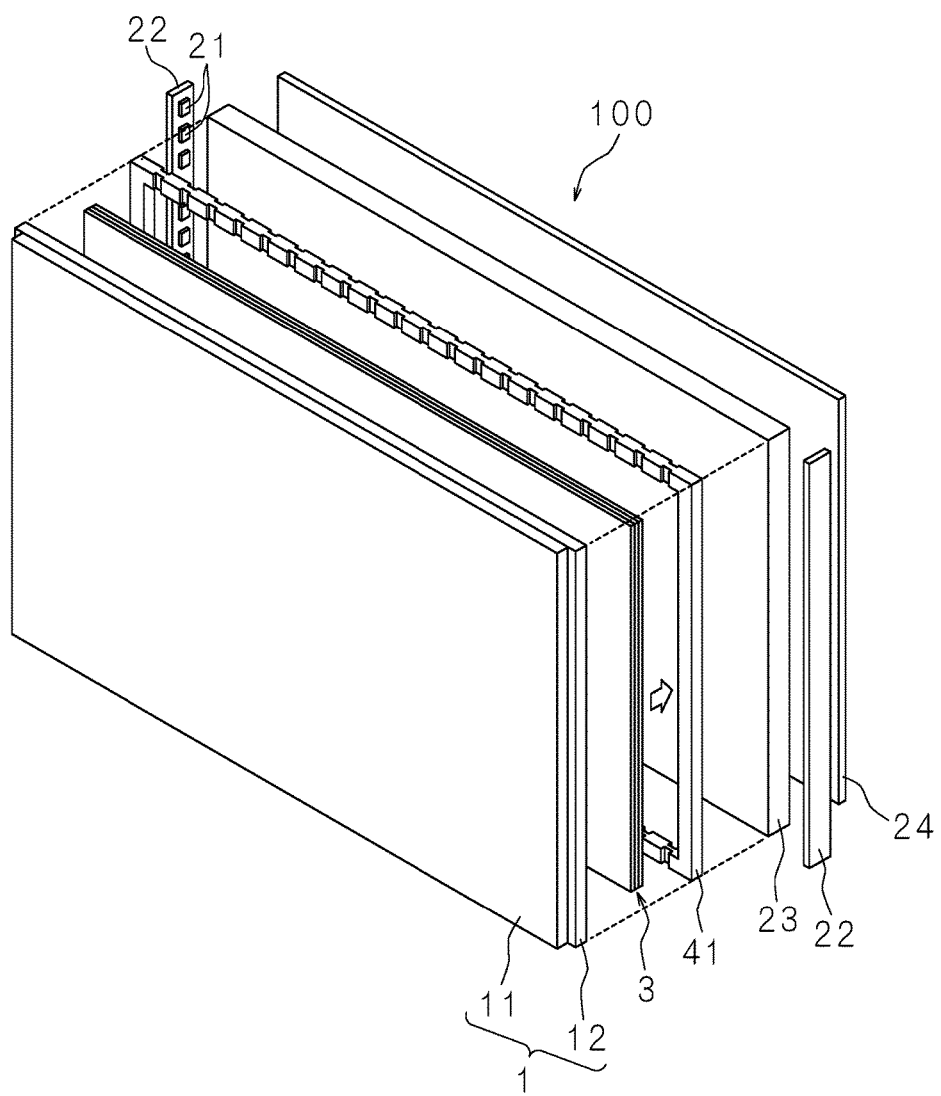
FIG. 1 is an exploded perspective view schematically illustrating main parts of a display apparatus according to Embodiment 1.

FIG. 1 is an exploded perspective view schematically illustrating main parts of a display apparatus 100 according to Embodiment 1. The display apparatus 100 comprises a liquid-crystal panel 1, a light emitting diode 21, a substrate 22, a light guide plate 23, a reflection sheet 24, an optical sheet 3 and a frame body 41.

The liquid-crystal panel 1 is a display panel having a shape of a rectangular flat plate. In the liquid-crystal panel 1 an active matrix system is employed. The liquid-crystal panel 1 is so configured that liquid crystal 13 (see FIGS. 3 and 4) is injected between two glass substrates 11 and 12 arranged to be opposed to each other with a predetermined distance in between, and is sealed with seal materials 14 (see FIGS. 3 and 4). It is noted that in the glass substrates 11 and 12, one glass substrate 11 has a longitudinal length slightly shorter than that of the other glass substrate 12.

The light emitting diode 21 is a light emitting element for emitting white light by a surface thereof which emits blue light or ultraviolet light being applied with a fluorescent material. The substrate 22 is a strip-shaped plate, and on one surface thereof the light emitting diodes 21 are aligned in a length direction of the substrate 22. Also on the substrate 22, a circuit for controlling lighting of the light emitting diode 21 is formed.

The light guide plate 23 is a plate-shaped member having a light-transmittance and is a rectangular glass plate in Embodiment 1. A broad surface of the light guide plate 23 has approximately the same size and the same shape as those of a broad surface of the liquid-crystal panel 1, especially the glass substrate 12. Scattering dots are formed by printing or laser machining on one broad surface of the light guide plate 23. The light guide plate 23 has approximately the same thickness as that of the substrate 22. The reflection sheet 24 is an optical sheet prepared by using a PET film as a base material, using a metal film etc. as a reflection layer and laminating them. The reflection sheet 24 has approximately the same size as that of the broad surface of the light guide plate 23.

The optical sheet 3 is a group of rectangular sheets prepared by using a PET film as a base material, and is a group of optical sheets including, for example, a lens sheet, a prism sheet and a diffusion sheet. The reflection sheet 3 has a size slightly smaller than that of the broad surface of the light guide plate 23.

The frame body 41 is, for example, made of resin such as PET, PC (Poly Carbonate, preferably Poly Carbonate with Glass Fiber (PC+GF)) or ABS. It is desirable for the material of the frame body 41 to be a material having a thermal expansion coefficient equal to or closer to that of glass. The frame body 41 has a rectangular outer shape approximately equal to or slightly smaller than the broad surface of the light guide plate 23. In portions extending in a longer direction of both surfaces of the frame body 41, provided are a plurality of recessed portions, which are recessed in a thickness direction, prepared by forming rectangular cutouts in the frame body 41 in a shorter direction. The plurality of recessed portions are disposed at equal intervals in the longer direction. To the both surfaces (except for the recessed portions) of the frame body 41, a double-sided tape or an OCA (Optically Clear Adhesive) tape for bonding the surfaces to glass is bonded, or an adhesive such as UV curable resin is adhered. It is to be noted that the frame body 41 itself may be a bonding material.

The liquid-crystal panel 1, the substrate 22 on which the light emitting diodes 21 are mounted, the light guide plate 23, the reflection sheet 24, the optical sheet 3 and the frame body 41 are assembled as described below on the basis of the light guide plate 23, to configure the display apparatus 100.

The frame body 41 is placed on a broad surface of the light guide plate 23 on which no scattering dots are formed. At this time, the frame body 41 is bonded to the light guide plate 23 by the bonding material bonded to the frame body 41 or by the frame body 41 itself. Next, the optical sheet 3 is placed in the frame body 41 as shown with a hollow arrow in FIG. 1. The frame body 41 has an inner circumference slightly larger than the optical sheet 3 to be placed therein, and has a thickness slightly larger than that of the optical sheet 3. The inner circumference and the thickness of the frame body 41 are set so as to surround the optical sheet 3 with a predetermined distance set in view of the thermal expansion of the optical sheet 3 in a plane direction and the thickness direction. Next, the liquid-crystal panel 1 is placed. The liquid-crystal panel 1 is so placed on the frame body 41 that a peripheral portion of the broad surface thereof at the glass substrate 12 side is in contact with the frame body 41. The glass substrate 12 is also bonded to the frame body 41 by the bonding material or by the frame body 41 itself. This allows the optical sheet 3 to be enclosed in the frame body 41 in a thermally expandable condition, so that the liquid-crystal panel 1 and the light guide plate 23 are integrally formed.

Figure 2:
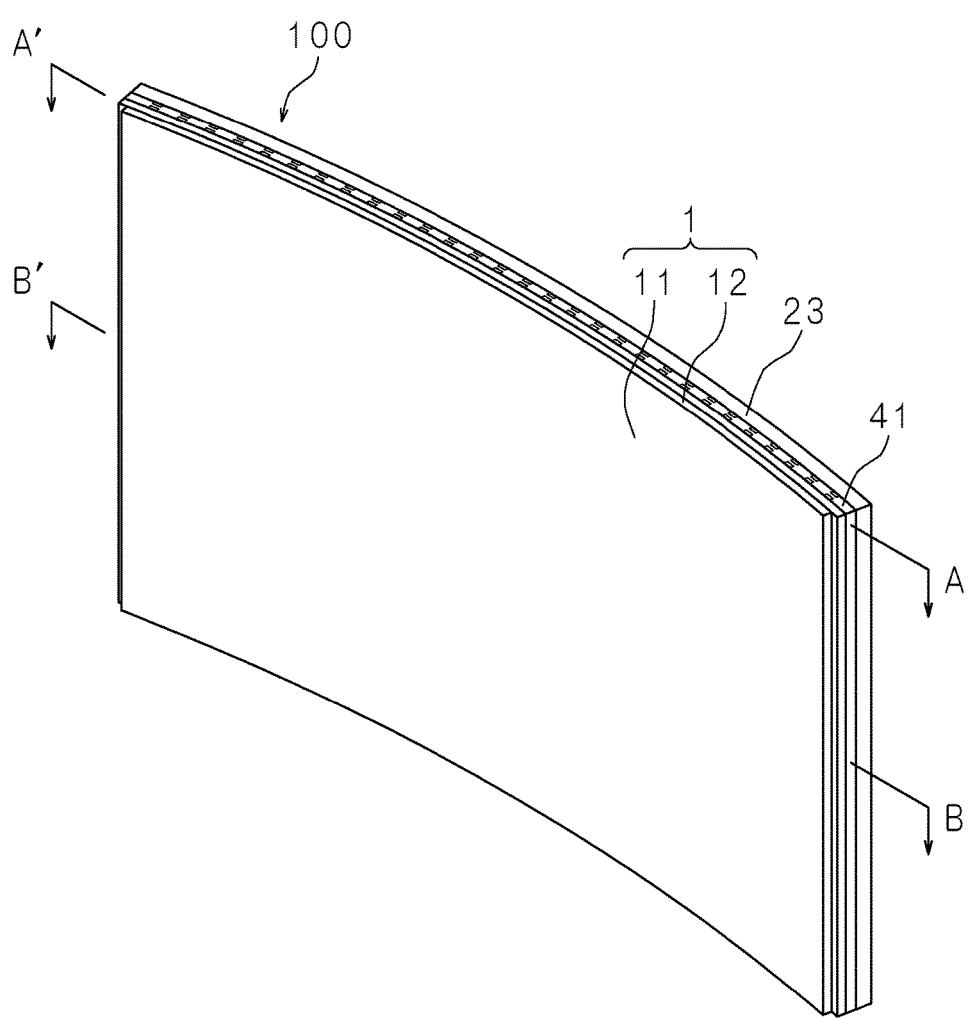
FIG. 2 is a perspective view schematically illustrating the deformed liquid-crystal panel, light guide plate and frame body.
Figure 3:
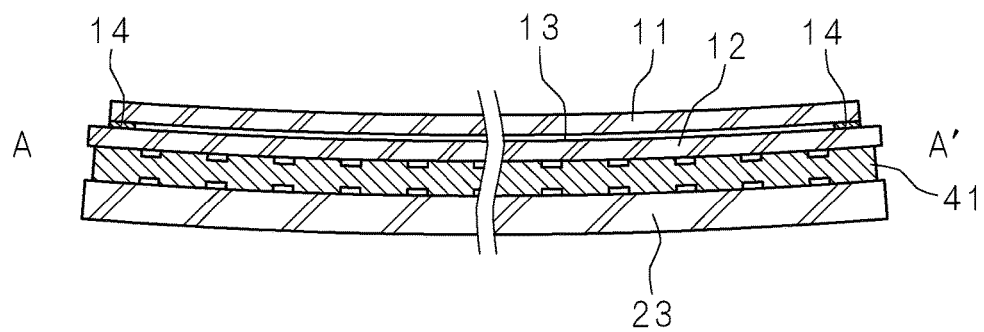
FIG. 3 is a schematic sectional view by a line A-A' of FIG. 2.
Figure 4:
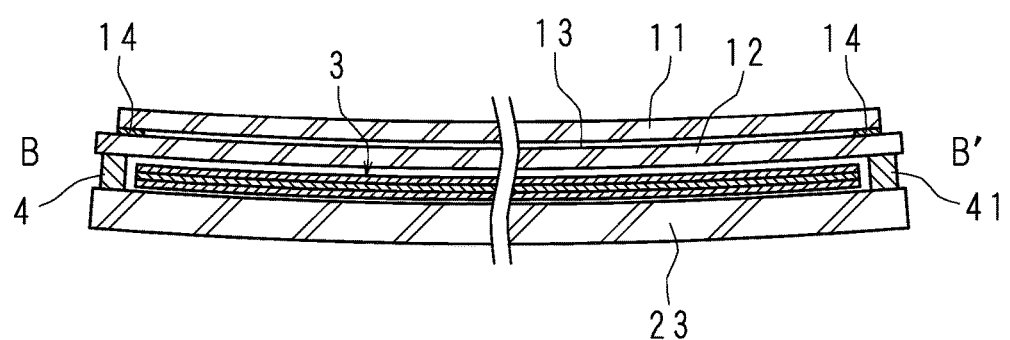
FIG. 4 is a schematic sectional view by a line B-B' of FIG. 2.

Next, the liquid-crystal panel 1 and the light guide plate 23 which are integrally formed via the frame body 41 are curved and deformed so that a display surface of the liquid-crystal panel 1 is concave. FIG. 2 is a perspective view schematically illustrating the deformed liquid-crystal panel 1, light guide plate 23 and frame body 41, FIG. 3 is a schematic sectional view by a line A-A' of FIG. 2, and FIG. 4 is a schematic sectional view by a line B-B' of FIG. 2. The light guide plate 23 according to Embodiment 1 is a glass plate as in the liquid-crystal panel 1, and it is therefore possible to integrally curve and deform the liquid-crystal panel 1 and the light guide plate 23.

In the case where the liquid-crystal panel 1 and the light guide plate 23 which are joined via the frame body 41 are curved and deformed, the damage or the separation of the frame body 41 is a problem. However, in the frame body 41, the recessed portions are provided on both of a contact surface thereof in contact with the liquid-crystal panel 1 and a contact surface thereof in contact with the light guide plate 23. These recessed portions are formed at a part proximal to the liquid-crystal panel 1 and at a part proximal to the light guide plate 23 respectively along a curvature direction, as shown in FIG. 3. In the case where the frame body 41 is curved and deformed, the recessed portions of the frame body 41 contract at the part proximal to the liquid-crystal panel 1 and expand at the part proximal to the light guide plate 23, but the difference of expansion/contraction is absorbed by the respective contractions or expansions of the recessed portions. That is, the frame body 41 has a flexibility due to the shape, which prevents the damage of the frame body 41 itself and the separation of the frame body 41 from the liquid-crystal panel 1 or the light guide plate 23.

With respect to the liquid-crystal panel 1 and light guide plate 23 joined as described above, the substrates 22 on which the light emitting diodes 21 are mounted are arranged to be opposed to both end surfaces at shorter sides of the light guide plate 23 (they are omitted in FIG. 2), and the reflection sheet 24 is arranged on the broad surface of the light guide plate 23 at the scattering dot side, to configure the display apparatus 100.

In the display apparatus 100 configured as described above, light emitted from the light emitting diode 21 enters the light guide plate 23 from the both end surfaces at the shorter sides of the light guide plate 23, and travels in the light guide plate 23 due to partial reflection by the respective surfaces or total reflection by the reflection sheet 24. The light traveling therein is emitted if the light reaches the broad surface opposite to the reflection sheet 24 at an angle smaller than a critical angle due to scattering by the scattering dots. Thus, light is uniformly emitted from respective portions of the broad surface of the light guide plate 23, and the emitted light further enters one surface of the optical sheet 3 and is emitted from an opposite surface of the optical sheet 3 as planar light with more uniform luminance distribution. It is therefore possible to irradiate the liquid-crystal panel 1 from the optical sheet 3 with light of a uniform lighting intensity.

In the conventional display apparatus, acrylic resin is frequently used for the light guide plate. A difference in expansion volume may occur due to heat from the light source, since glass which is a material of the substrate of the liquid-crystal panel has an expansion coefficient different from that of acrylic resin which is a material of the light guide plate. The difference in expansion volume will not be a problem in a small display apparatus, but may cause problems in a large display apparatus as the difference would be larger, possibly causing separation of the liquid-crystal panel from the light guide plate in the case where the liquid-crystal panel is bonded and then fixed to the light guide plate, and also causing the light guide plate to warp if the bonding strength is high. Furthermore, in a case of the curved display, the difference in thermal expansion volume would be larger not only in the plane direction but also in the thickness direction, which may damage the apparatus. To address this, in the display apparatus 100 as described in Embodiment 1, the light guide plate 23 is made of glass, the optical sheet 3 is enclosed in the frame body 41 in the thermally expandable condition as shown in FIG. 4, and the liquid-crystal panel 1 is joined to the light guide plate 23 by bonding. The difference in thermal expansion volume does not occur since the thermal expansion coefficient of the glass substrates 11 and 12 of the liquid-crystal panel 1 is equal to that of the light guide plate 23. The liquid-crystal panel 1 is joined to the light guide plate 23, which does not require a holding member for positioning the light guide plate 23 with respect to the liquid-crystal panel 1. Furthermore, the optical sheet 3 is also enclosed in the frame body 41, which does not further require a holding member for positioning the optical sheet 3. This allows the reduction in thickness because of the thickness of the holding member and further allows the reduction in border width because of the difference between the outer periphery of the holding member and the outer periphery of the light guide plate 23 or the optical sheet 3. Furthermore, the joined liquid-crystal panel 1 and light guide plate 23 are made of glass and a rigidity of glass is higher than that of resin, and a curved surface can thereby be maintained without a special holding structure for surrounding the liquid-crystal panel 1 and the light guide plate 23, which allows the reduction in thickness and border width of the curved display. Furthermore, the liquid-crystal panel 1 is joined to the light guide plate 23, which facilitates the manufacture of the curved display, as compared with a case where the light guide plate made of resin is used. Furthermore, the frame body 41 for bonding the light guide plate 23 to the liquid-crystal panel 1 has a shape giving the frame body 41 the flexibility, which prevents the damage, separation and the like of the frame body 41 and the occurrence of defects, and keeps a display quality successfully.

The plurality of recessed portions may be provided on only one of the contact surface in contact with the liquid-crystal panel 1 and the contact surface in contact with the light guide plate 23. FIG. 5 is a schematic sectional view of a frame body 42 of the other shape according to Embodiment 1. It is desirable for the frame body 42 to be made of resin such as PET, PC or ABS for example and is desirable for the material of the frame body 42 to be a material having a thermal expansion coefficient equal to or closer to that of glass. The frame body 42 has an outer shape approximately equal to or slightly smaller than the broad surface of the light guide plate 23. The frame body 42 of the other shape is different from the frame body 41 according to Embodiment 1 where the recessed portions are provided on both of the contact surface in contact with the liquid-crystal panel 1 and the contact surface in contact with the light guide plate 23. The frame body 42 has a shape of recessed portions being provided on only a contact surface in contact with the light guide plate 23 which is convex in the case where the light guide plate 23 is curved, as shown in FIG. 5. The plurality of recessed portions of the frame body 42 which are proximal to the light guide plate 23 are enlarged respectively in the case where the liquid-crystal panel 1 and the light guide plate 23 are curved and deformed. This allows absorption of a difference of expansion/contraction on a contact surface in contact with the liquid-crystal panel 1 and a contact surface in contact with the light guide plate 23 due to the curving and the deforming. That is, the frame body 42 has a flexibility due to the shape, which prevents the damage of the frame body 42 itself and the separation of the frame body 42 from the liquid-crystal panel 1 or the light guide plate 23.

The shapes of the recessed portions of the frame body 41 and the frame body 42 may be not only the rectangular shape but also a corrugated shape and the like, or may be the other shape giving the frame body the flexibility to such an extent that the frame body can follow the curved shapes of the liquid-crystal panel 1 and the light guide plate 23.

Modified Example 1

Figure 6:
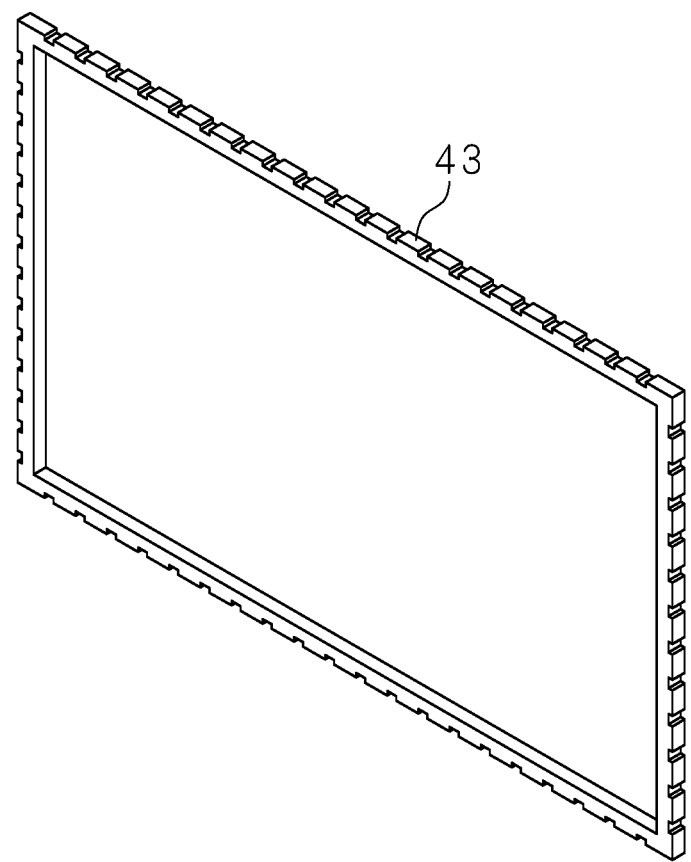
FIG. 6 is a schematic perspective view of a frame body according to Modified Example 1.
Figure 7:
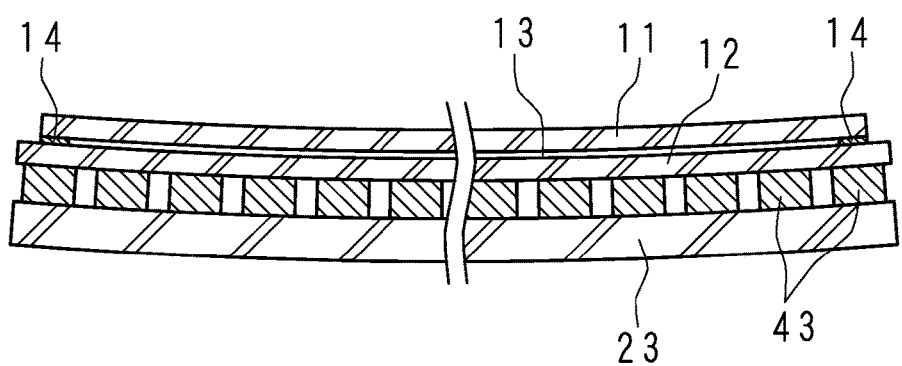
FIG. 7 is a schematic sectional view of the liquid-crystal panel, the light guide plate and the frame body according to Modified Example 1.

FIG. 6 is a schematic perspective view of a frame body 43 according to Modified Example 1, and FIG. 7 is a schematic sectional view of the liquid-crystal panel 1, the light guide plate 23 and the frame body 43 according to Modified Example 1. It is desirable for the frame body 43 to be made of resin such as PET, PC or ABS as in the frame body 41 and is desirable for a material of the frame body 43 to be a material having a thermal expansion coefficient equal to or closer to that of glass. The frame body 43 has an outer shape approximately equal to or slightly smaller than the broad surface of the light guide plate 23. The frame body 43 according to Modified Example 1 has comb-teeth portions over an entire circumference of an outer peripheral thereof, as shown in FIG. 6.

The comb-teeth portions of the outer peripheral of the frame body 43 are spaced apart from each other along the curvature direction, as shown in FIG. 7. Distances of the comb-teeth portions of the frame body 43 decrease at a part proximal to the liquid-crystal panel 1 and increase at a part proximal to the light guide plate 23 respectively during the curving and the deforming, but the difference of expansion/contraction is absorbed due to the decrease or the increase of the distances of the comb-teeth portions. That is, the frame body 43 has a flexibility due to the shape, which prevents the damage of the frame body 43 itself and the separation of the frame body 43 from the liquid-crystal panel 1 or the light guide plate 23.

Figure 8:
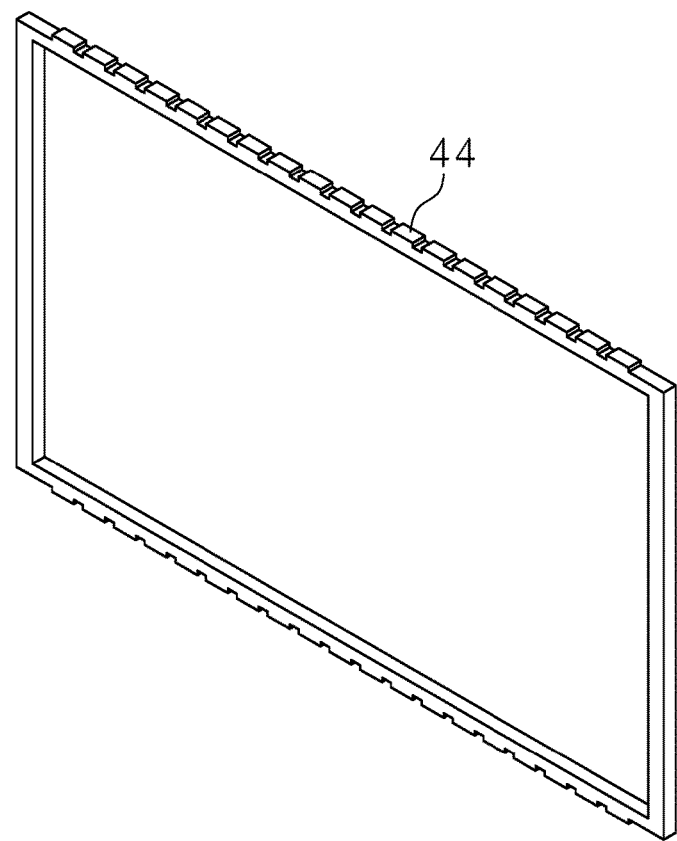
FIG. 8 is a schematic perspective view illustrating the frame body of the other shape according to Modified Example 1.

It is noted that the comb-teeth portions may be provided in a longitudinal direction of a frame body 44 only. FIG. 8 is a schematic perspective view illustrating the frame body 44 of the other shape according to Modified Example 1, and FIG. 9 is a schematic sectional view of the frame body 44 of the other shape, the liquid-crystal panel 1 and the light guide plate 23. As shown in FIGS. 8 and 9, the comb-teeth portions may be so formed that the recessed portions are displaced at corner portions.

Modified Example 2

Figure 10:
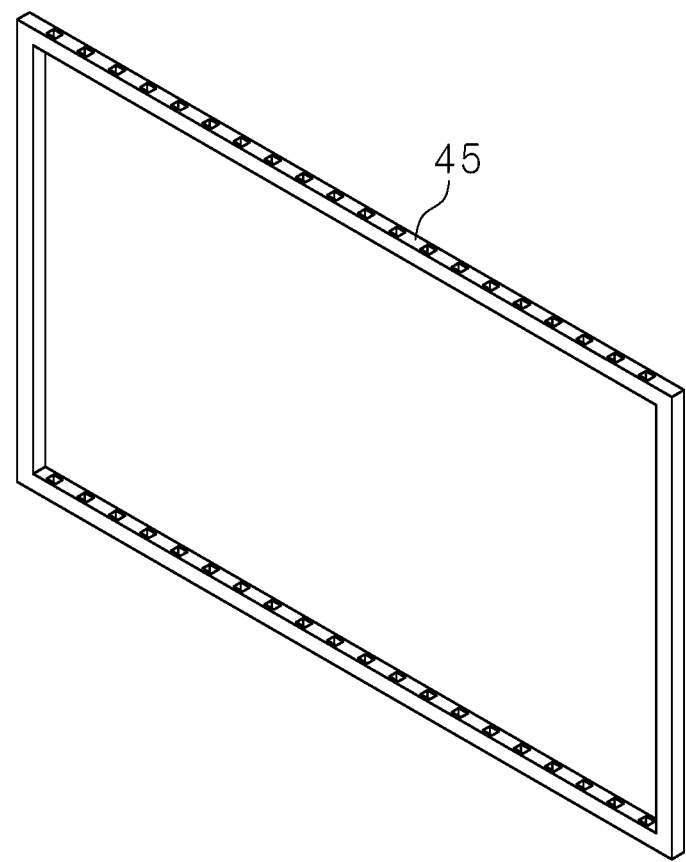
FIG. 10 is a schematic perspective view of a frame body according to Modified Example 2.
Figure 11:
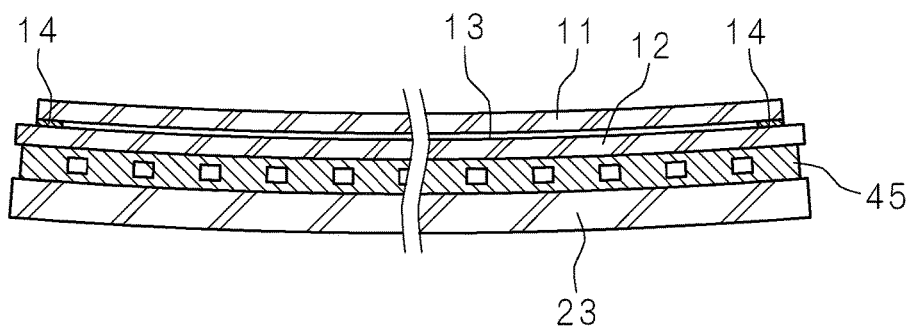
FIG. 11 is a schematic sectional view of the liquid-crystal panel, the light guide plate and the frame body according to Modified Example 2.

FIG. 10 is a schematic perspective view of a frame body 45 according to Modified Example 2, and FIG. 11 is a schematic sectional view of the liquid-crystal panel 1, the light guide plate 23 and the frame body 45 according to Modified Example 2. It is desirable for the frame body 45 to be made of resin such as PET, PC or ABS as in the frame body 41 and is desirable for a material of the frame body 45 to be a material having a thermal expansion coefficient equal to or closer to that of glass. The frame body 45 has an outer shape approximately equal to or slightly smaller than the broad surface of the light guide plate 23. The frame body 45 according to Modified Example 2 is provided with a plurality of recessed portions on a part of an outer peripheral surface along a longitudinal direction of the frame body 45, as shown in FIGS. 10 and 11. The plurality of recessed portions are disposed at equal intervals in the longitudinal direction. The plurality of recessed portions may have a shape of hole penetrating the frame body 45, or may be recessed portions which are recessed on the outside of the frame body 45.

The plurality of recessed portions of the frame body 45 contract at a part proximal to the liquid-crystal panel 1 and enlarge at a part proximal to the light guide plate 23 respectively in the case where the liquid-crystal panel 1 and the light guide plate 23 are curved and deformed. This allows absorption of a difference of expansion/contraction on a contact surface in contact with the liquid-crystal panel 1 and a contact surface in contact with the light guide plate 23 due to the curving and the deforming. That is, the frame body 45 has a flexibility due to the shape, which prevents the damage of the frame body 45 itself and the separation of the frame body 45 from the liquid-crystal panel 1 or the light guide plate 23.

Embodiment 2

Figure 12:
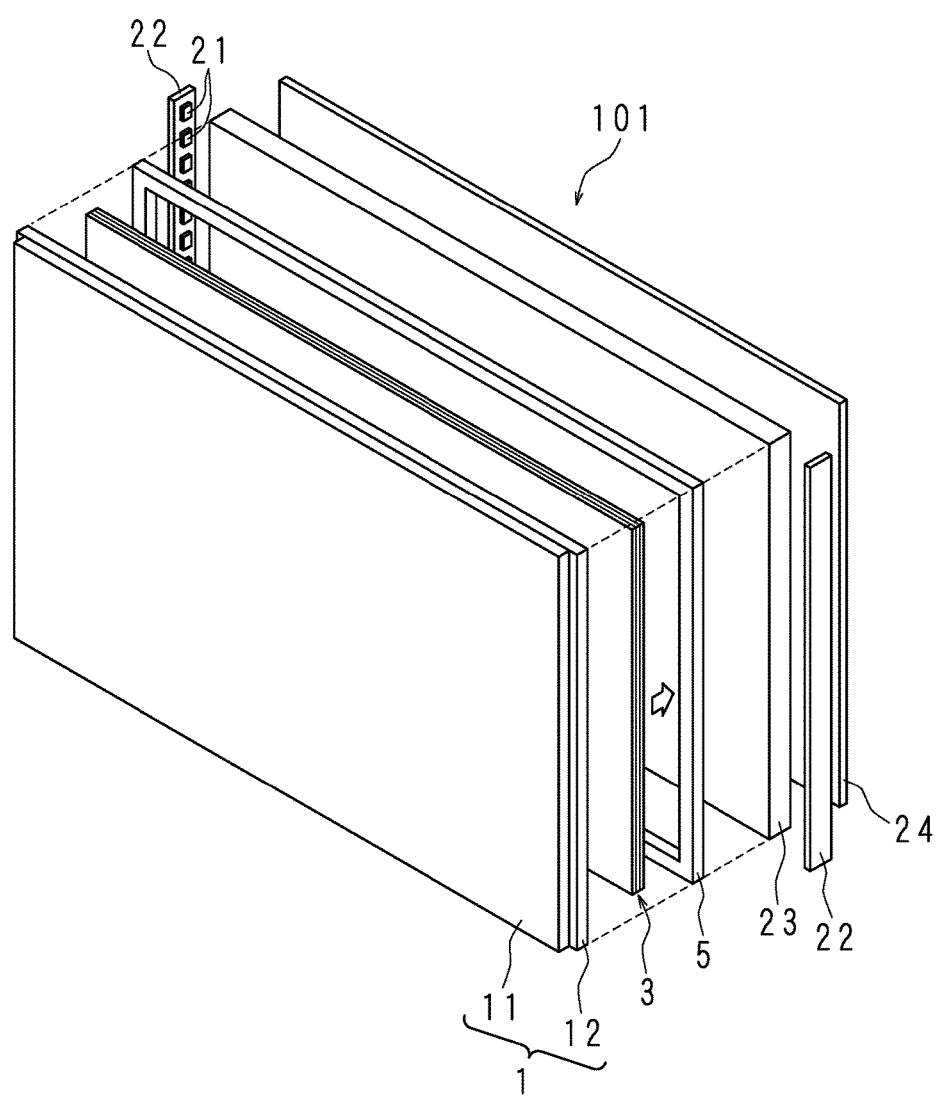
FIG. 12 is an exploded perspective view schematically illustrating main parts of a display apparatus according to Embodiment 2.

FIG. 12 is an exploded perspective view schematically illustrating main parts of a display apparatus 101 according to Embodiment 2. In Embodiment 2, the display apparatus 101 comprises the liquid-crystal panel 1, the light emitting diode 21, the substrate 22, the light guide plate 23, the reflection sheet 24, the optical sheet 3 and a frame body 5. The configuration of the display apparatus 101 according to Embodiment 2 except for the frame body 5 is similar to the configuration according to Embodiment 1, and the common configuration parts are therefore denoted by the same reference numerals and will not be described in detail.

The frame body 5 is made of a porous material such as urethane resin, for example. The frame body 5 has an outer shape approximately equal to or slightly smaller than the broad surface of the light guide plate 23. The frame body 5 has an inner circumference slightly larger than the optical sheet 3 to be placed therein, and has a thickness slightly larger than that of the optical sheet 3. The frame body 5 is disposed between the liquid-crystal panel 1 and the light guide plate 23 to join the liquid-crystal panel 1 to the light guide plate 23. In the frame body 5, the optical sheet 3 is placed as shown with a hollow arrow in FIG. 12. The inner circumference and the thickness of the frame body 5 are set so as to surround the optical sheet 3 with a predetermined distance set in view of the thermal expansion of the optical sheet 3 in the plane direction and the thickness direction. To both surfaces of the frame body 5, a double-sided tape or an OCA tape for bonding the surfaces to glass may be bonded, an adhesive such as UV curable resin may be adhered, or the frame body 5 itself may be a bonding material.

Figure 13:
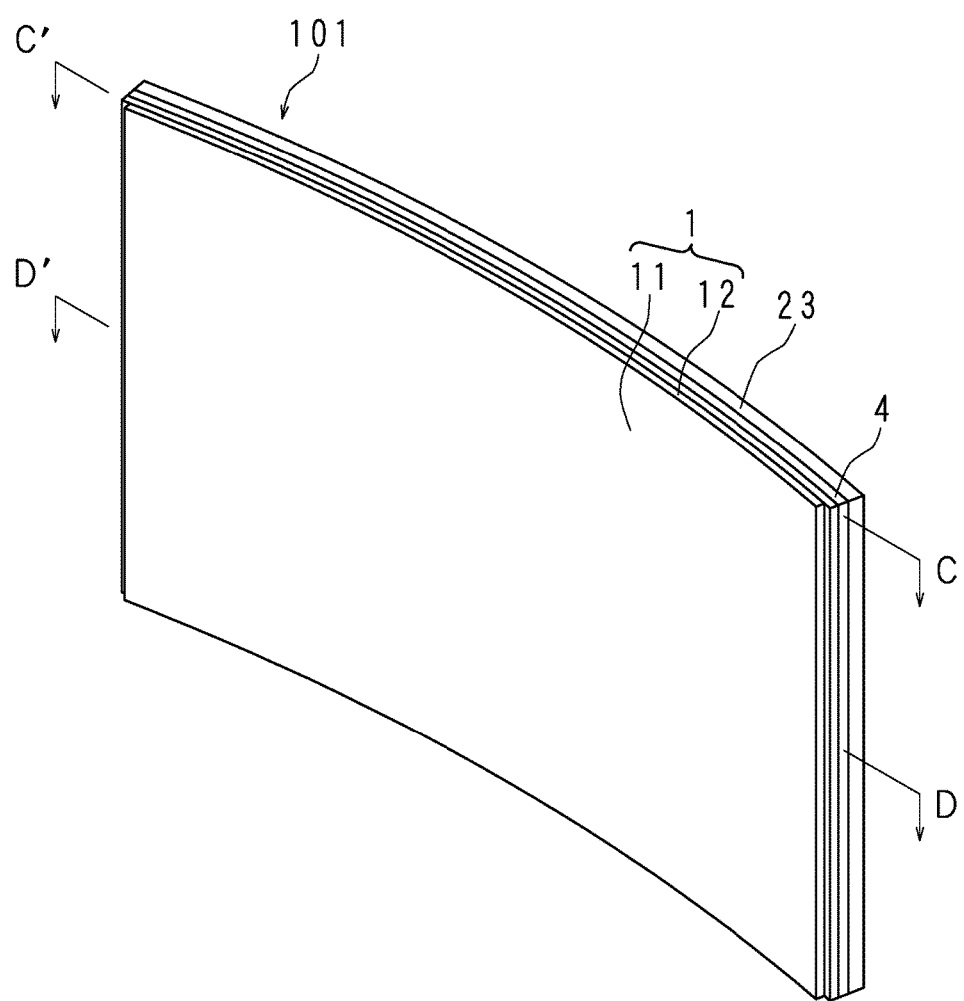
FIG. 13 is a perspective view schematically illustrating the deformed liquid-crystal panel, light guide plate and frame body according to Embodiment 2.

Next, the liquid-crystal panel 1 and the light guide plate 23 which are joined via the frame body 5 are so curved and deformed that a display surface of the liquid-crystal panel 1 is concave. FIG. 13 is a perspective view schematically illustrating the deformed liquid-crystal panel 1, light guide plate 23 and frame body 5 according to Embodiment 2, FIG. 14 is a schematic sectional view by a line C-C' of FIG. 13, and FIG. 15 is a schematic sectional view by a line D-D' of FIG. 13.

Figure 14:
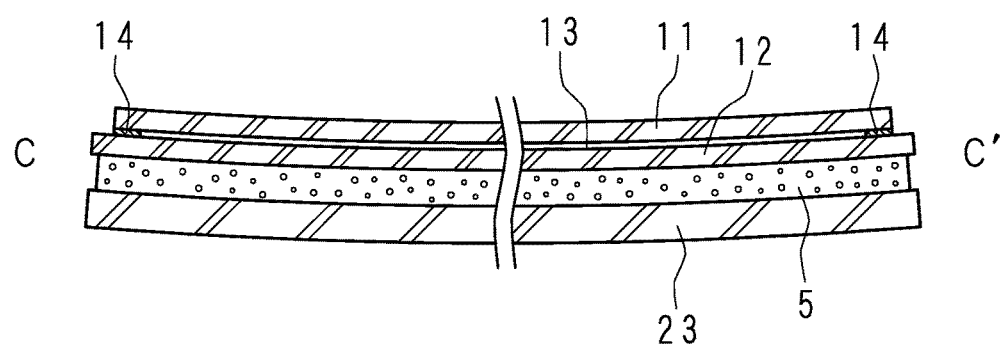
FIG. 14 is a schematic sectional view by a line C-C' of FIG. 13.
Figure 15:
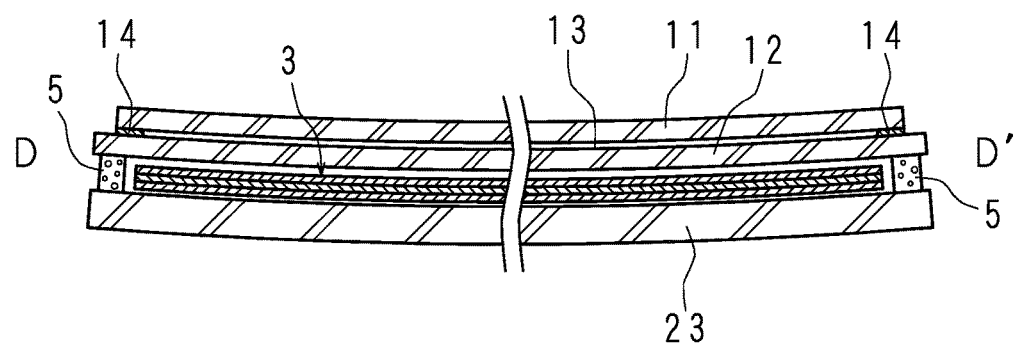
FIG. 15 is a schematic sectional view by a line D-D' of FIG. 13.

The frame body 5 is made of the porous material, and is therefore provided with many cavities therein, as shown in FIGS. 14 and 15. In the case where the joined liquid-crystal panel 1 and light guide plate 23 are curved and deformed, the frame body 5 contracts at a part proximal to the liquid-crystal panel 1 and expands at a part proximal to the light guide plate 23, but the difference of expansion/contraction is absorbed due to the contraction or the expansion of the internal many cavities. That is, the frame body 5 has a flexibility due to the material, which prevents the damage of the frame body 5 itself and the separation of the frame body 5 from the liquid-crystal panel 1 or the light guide plate 23.

With respect to the liquid-crystal panel 1 and light guide plate 23 joined as described above, the substrates 22 on which the light emitting diodes 21 are mounted are arranged to be opposed to both end surfaces at shorter sides of the light guide plate 23 (they are omitted in FIG. 13), and the reflection sheet 24 is arranged on the broad surface of the light guide plate 23 at the scattering dot side, to configure the display apparatus 101.

Also in the display apparatus 101, the optical sheet 3 is enclosed in the frame body 5 in the thermally expandable condition as shown in FIG. 15, and the liquid-crystal panel 1 is joined to the light guide plate 23 by bonding. Also in the display apparatus 101, the difference in thermal expansion volume does not occur since the thermal expansion coefficient of the integrally formed glass substrates 11 and 12 of the liquid-crystal panel 1 is equal to that of the light guide plate 23. The liquid-crystal panel 1 is joined to the light guide plate 23, which does not require a holding member for positioning the light guide plate 23 with respect to the liquid-crystal panel 1. Furthermore, the optical sheet 3 is also enclosed in the frame body 5, which does not require a holding member for positioning the optical sheet 3. This allows the reduction in thickness because of the thickness of the holding member and further allows the reduction in border width because of the difference between the outer periphery of the holding member and the outer periphery of the light guide plate 23 or the optical sheet 3. Furthermore, the joined liquid-crystal panel 1 and light guide plate 23 are made of glass and a rigidity of glass is higher than that of resin, and a curved surface can thereby be maintained without a special holding structure for surrounding the liquid-crystal panel 1 and the light guide plate 23, which allows the reduction in thickness and border width of the curved display. Furthermore, the liquid-crystal panel 1 is joined to the light guide plate 23, which facilitates the manufacture of the curved display, as compared with a case where the light guide plate made of resin is used. Furthermore, the frame body 5 for bonding the light guide plate 23 to the liquid-crystal panel 1 is made of the porous material to give the frame body 5 the flexibility, which prevents the damage, separation and the like of the frame body 5 and the occurrence of defects, and keeps a display quality successfully.

It is noted that the frame body 5 made of the porous material according to Embodiment 2 may be provided with comb-teeth portions in one or both of an outer peripheral and an inner peripheral thereof as in Embodiment 1.

In Embodiments 1 and 2, both of the display apparatuses 100 and 101 are configured as the curved display which is curved so that the display surface of the liquid-crystal panel 1 is concave. However, the curved display may be curved so that the display surface of the liquid-crystal panel 1 is convex. It is to be understood that the display apparatuses may be configured as a flat display without the curving and deforming thereof.

It is noted that the present Embodiments disclosed in the above are illustrated in all aspects and are regarded as not being limitative. The scope of the present invention is defined not by the above descriptions of the Embodiments but by the Claims, which intends to include all the meanings equivalent to the Claims and all the modifications within the scope.

The invention claimed is:

1. A display apparatus comprising:
   a liquid-crystal panel provided with a pair of glass substrates being opposed to each other, a liquid-crystal material being enclosed between the pair of glass substrates;
   a light guide plate being opposed to the liquid-crystal panel, having a light-transmittance and being made of glass;
   an optical sheet arranged between the liquid-crystal panel and the light guide plate; and
   a frame body which joins respective peripheral portions of the liquid-crystal panel and the light guide plate with a predetermined distance between the liquid crystal panel and the light guide plate, having a rectangular outer shape, and having a flexibility,
   wherein the frame body is provided with a plurality of recessed portions at a first part along a first side of four sides of the frame body, the first part being located between the liquid-crystal panel and the light guide plate, the plurality of recessed portions being formed over substantially a whole length of the first side.

2. The display apparatus according to claim 1, wherein each of the liquid-crystal panel and the light guide plate has a curved surface.

3. The display apparatus according to claim 2, wherein the plurality of recessed portions are also formed at a second part along a second side of four sides of the frame body, the second part being located between the liquid-crystal panel and the light guide plate, the second side being opposed to the first side, and formed over substantially a whole length of the second side,
the first and second sides are curved, and
remaining sides except the first and second sides among the four sides are not curved.

4. The display apparatus according to claim 3, wherein the plurality of recessed portions are not formed at a part along the remaining sides.

5. The display apparatus according to claim 3, wherein the plurality of recessed portions are provided in a thickness direction on both of a contact surface of the frame body with the liquid-crystal panel and a contact surface of the frame body with the light guide plate.

6. The display apparatus according to claim 3, wherein the liquid-crystal panel and the light guide plate are curved to form center parts of the first side and the second side to be convex toward one direction of thickness, and
the plurality of recessed portions are provided in the thickness direction on convex surfaces of the first part and the second part.

7. The display apparatus according to claim 3, wherein the liquid-crystal panel and the light guide plate are curved to form center parts of the first side and the second side to be convex toward the light guide plate, and
the plurality of recessed portions are provided in the thickness direction on a contact surface in contact with the light guide plate.

8. The display apparatus according to claim 1, wherein the plurality of recessed portions are provided on one or both of contact surfaces of the frame body in contact with the liquid-crystal panel and the light guide plate, in a thickness direction.

9. The display apparatus according to claim 1, wherein the plurality of recessed portions are provided on an outer peripheral surface of the frame body.

10. The display apparatus according to claim 9, wherein the plurality of recessed portions each have a shape of a hole penetrating the frame body from an outer peripheral surface of the frame body to an inner peripheral surface of the frame body.

11. The display apparatus according to claim 1, wherein the plurality of recessed portions have a comb-teeth shape in one or both of an outer peripheral and an inner peripheral of the frame body.

12. The display apparatus according to claim 1, wherein the frame body is made of a porous material.

13. The display apparatus according to claim 1, wherein the frame body has an outer periphery substantially equal to an outer periphery of the liquid-crystal panel and an outer periphery of the light guide plate.

14. The display apparatus according to claim 1, wherein the plurality of recessed portions are disposed at equal intervals in the first part.

* * * * *